(12) United States Patent
Markovic et al.

(10) Patent No.: US 7,692,660 B2
(45) Date of Patent: Apr. 6, 2010

(54) GUIDED PERFORMANCE OPTIMIZATION FOR GRAPHICS PIPELINE STATE MANAGEMENT

(75) Inventors: Relja Markovic, Seattle, WA (US); Ramanujan Srinivasan, Seattle, WA (US); Samuel Glassenberg, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 512 days.

(21) Appl. No.: 11/477,609

(22) Filed: Jun. 28, 2006

(65) Prior Publication Data

US 2008/0001956 A1    Jan. 3, 2008

(51) Int. Cl.
    *G06T 1/00*    (2006.01)
(52) U.S. Cl. .................. 345/522; 345/501; 345/530
(58) Field of Classification Search ......... 345/501–506, 345/519, 520, 522, 530–574
See application file for complete search history.

(56) References Cited

U.S. PATENT DOCUMENTS

| 6,070,202 | A | * | 5/2000 | Minkoff et al. ............... 710/56 |
|---|---|---|---|---|
| 6,295,608 | B1 | * | 9/2001 | Parkes et al. .................... 714/1 |
| 6,631,423 | B1 | * | 10/2003 | Brown et al. ................. 719/323 |
| 6,784,888 | B2 | * | 8/2004 | Taylor et al. ................. 345/522 |
| 6,910,106 | B2 | * | 6/2005 | Sechrest et al. ............. 711/136 |
| 6,943,800 | B2 | * | 9/2005 | Taylor et al. ................. 345/543 |
| 6,980,209 | B1 | * | 12/2005 | Donham et al. ............. 345/426 |
| 7,385,607 | B2 | * | 6/2008 | Bastos et al. ................. 345/502 |
| 2004/0003370 | A1 | * | 1/2004 | Schenk et al. ............... 717/100 |
| 2004/0068627 | A1 | * | 4/2004 | Sechrest et al. ............. 711/158 |
| 2005/0243094 | A1 | * | 11/2005 | Patel et al. .................... 345/506 |

OTHER PUBLICATIONS

Pellacini, User-Configurable Automatic Shader Simplification, Jul. 31-Aug. 4, 2005, International Conference on Computer Graphics and Interactive Techniques, ACM SIGGRAPH 2005 Papers, pp. 445-452.*

* cited by examiner

*Primary Examiner*—Xiao M Wu
*Assistant Examiner*—Charles Tseng

(57) ABSTRACT

Techniques are provided for efficiently arranging shader constants into constant buffers to more efficiently set shader constants to a GPU. Techniques are provided for tracking runtime usage patterns of shader constants, and then generating usage pattern data regarding usage patterns of shader constants. This usage pattern data can then be fed into an optimization algorithm to efficiently lay out the data for maximal performance given certain heuristics. Factors considered include, for example, frequency of client update of the values, usage by certain shaders, and size and number of the resulting buffers.

17 Claims, 8 Drawing Sheets

|    | SHADER A      | SHADER B       | SHADER C       | SHADER N       |
|----|---------------|----------------|----------------|----------------|
| C1 | Consumed fresh | Consumed stale | Consumed fresh | Consumed stale |
| C2 | Consumed fresh | Consumed stale | Consumed fresh | Consumed stale |
| C3 | Non-consumed  | Consumed fresh | Non-consumed   | Non-consumed   |
| C4 | Non-consumed  | Consumed fresh | Non-consumed   | Non-consumed   |
| C5 | Non-consumed  | Non-consumed   | Consumed fresh | Consumed stale |

FIG. 6

GUIDED PERFORMANCE OPTIMIZATION FOR GRAPHICS PIPELINE STATE MANAGEMENT

BACKGROUND

Rendering and displaying three dimensional (3-D) graphics on screen typically involves many calculations and computations. In a simple graphics system, such computations occur according to some level of cooperative or shared processing by the central processing unit (CPU) and the graphics processing unit (GPU). In an exemplary scenario, after instructions are processed and some initial computations occur in the CPU, a set of coordinate points or vertices that define the object to be rendered are stored in video memory for further processing by the GPU in the graphics pipeline. When graphics programmers develop graphics applications via a set of available graphics APIs, the programmer generally indicates a set of vertices to be operated upon by a set of algorithmic elements.

The data is sent into the graphics pipeline, and each vertex is streamed through a configurable set of GPU subunits. One or more programmable shader units, sometimes referred to as shaders or "shader programs," can operate on the data and perform specialized operations on graphics data. Shaders can include, for example, vertex shader(s), geometry shader(s) and pixel shader(s).

Rather than creating a plurality of different shader programs for each specific scenario, a single shader program can receive different combinations of shader constants, and depending on the combination of particular shader constants that are selected, the output of the shader will vary. These shader constants can specify, for example, how pixels are combined, how data is read in and out, and in the case of a texture, how values are extracted from that texture. Shader constants can be used to specify, for example, things like light positions, view transformations which certain objects undergo, material parameters such as color and reflectivity. For instance, a particular shader program can be fed different constants which can define, for example, what type of surface is present and how in view of those constants the light would reflect off a particular surface. For example, light would reflect differently off a plain wood surface than it would off a laminated wood surface. The shader constants are used to specify how this reflection would occur. If the shader program is computing a lighting equation, the CPU can provide shader constants which define light positions or light colors. These constant values are unchanged throughout the shader invocation.

The process of shading is a computation intensive and complex process. When these specific shaders operate in a graphics pipeline, there are regular bottlenecks due to the operations that occur in each stage. One inefficiency in graphics programming results from time spent setting state and issuing commands to the GPU. "State" refers to a large amount of data (numbers or values) that describes how the hardware pipeline is to be configured, and how it will behave. One component of this state is a set of shader constants that need to be bound to the GPU before executing a shader program. It is desirable to reduce time spent setting state (e.g., shader constants) to the GPU.

Some shaders utilize constant buffers (as opposed to constant registers) which hold groups or aggregations of shader constants. Constant buffers can allow shader constants to be set to the GPU more rapidly since the aggregations of shader constants are grouped together.

SUMMARY

Techniques are provided for efficiently arranging shader constants into constant buffers to more efficiently set shader constants to a GPU. Techniques are provided for tracking runtime usage patterns of shader constants, and then generating usage pattern data regarding usage patterns of shader constants. This usage pattern data can then be fed into an optimization algorithm to efficiently lay out the data for maximal performance given certain heuristics. Factors considered include, for example, frequency of client update of the values, usage by certain shaders, and size and number of the resulting buffers.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The systems and methods for use in optimizing performance of a graphics pipeline are further described with reference to the accompanying drawings in which:

FIG. 6 illustrates an exemplary non-limiting chart having columns representing each of the particular shaders (A . . . N) and rows illustrating particular shader constants (C1-C5) which are used in the particular shader constant buffers which are used in conjunction with each of the particular shaders (A . . . N);

DETAILED DESCRIPTION

Figure 1:
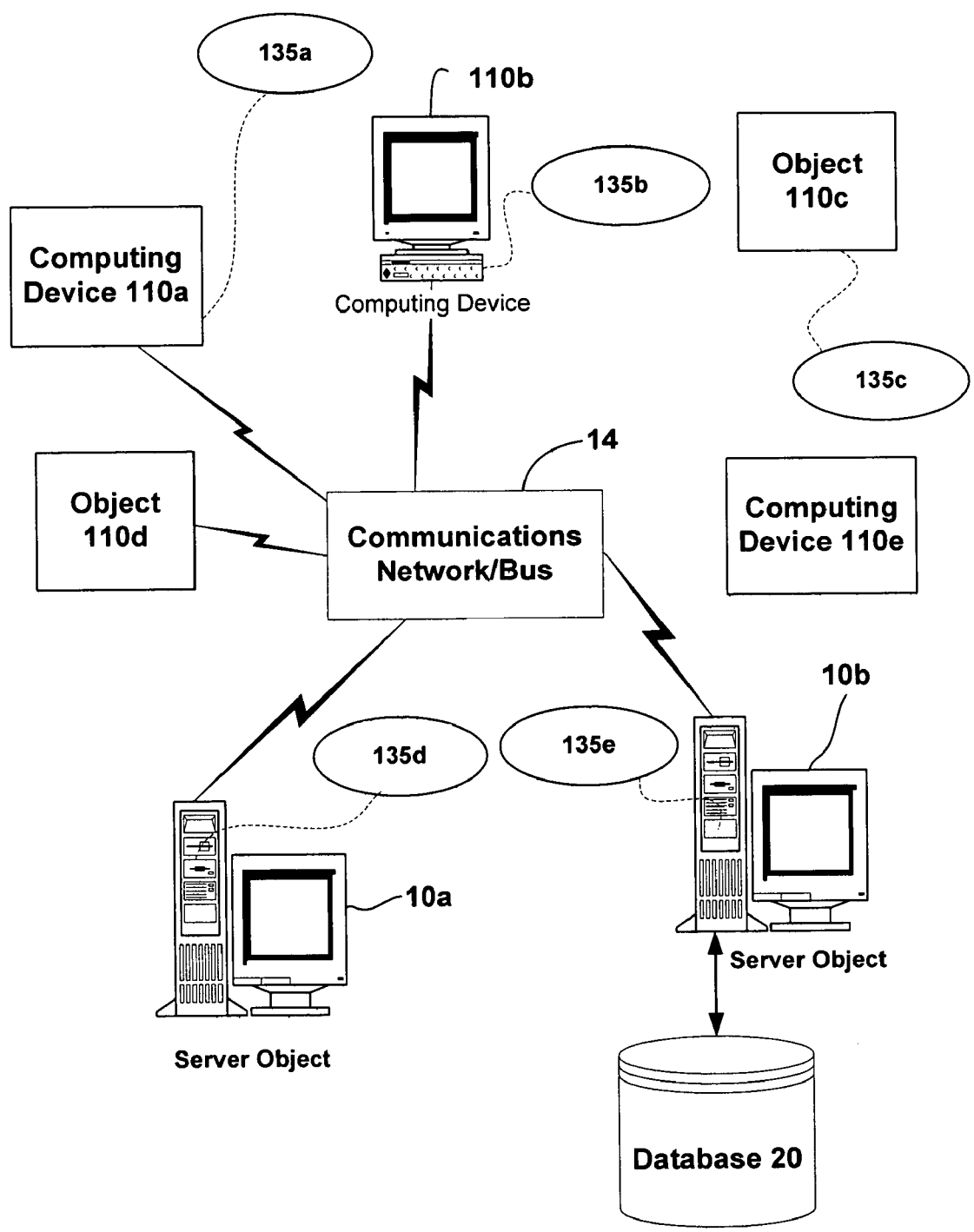
FIG. 1 is a block diagram representing an exemplary network environment having a variety of computing devices in which the present invention may be implemented.

The following detailed description is merely exemplary in nature and is not intended to limit the invention or the application and uses of the invention. As used herein, the word "exemplary" means "serving as an example, instance, or illustration." Any implementation described herein as "exemplary" is not necessarily to be construed as preferred or advantageous over other implementations. All of the implementations described below are exemplary implementations provided to enable persons skilled in the art to make or use the invention and are not intended to limit the scope of the invention which is defined by the claims. Furthermore, there is no intention to be bound by any expressed or implied theory presented in the preceding background, brief summary or the following detailed description.

Terminology

As used herein, the term "shader" can be used to generically to refer to either the hardware subunit of the GPU that performs the execution or to refer to the set of instructions or tokens downloaded to the GPU that are subsequently loaded into memory, and used by the shader (hardware) to perform the shading. The term "shader" can also refer to both working together. Where the term "subunit" is also used in connection with the term "shader," the term "shader" should be construed to refer to the subunit of the GPU that performs the processing associated with the shading. The term "shader program" can generally refer to computer programs or processes, that reside and run in the graphics pipeline, which can be used to help determine/define the final, on-screen surface properties of an image or object in a 3D on-screen environment. "Shaders" can perform billions (or more) of computations a second in order to perform their specific tasks.

As used herein, the term "shader constant" can refer to different parameters or variables that are fed into a shader program that allow the shader program to produce different results based on the particular shader constants that are used. Shader constants do not have to be a part of the shader program itself. Shader programs can receive a range of different values for each shader constant over the course of an applications execution.

Overview

Techniques are provided for tracking runtime usage patterns of shader constants, and then generating usage pattern data regarding usage patterns of shader constants. This usage pattern data can then be fed into an optimization algorithm to efficiently lay out the data for maximal performance given certain heuristics. Factors considered include, for example, frequency of client update of the values, usage by certain shaders, and size and number of the resulting buffers.

Exemplary Networked and Distributed Environments

One of ordinary skill in the art can appreciate that the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with processes for a non-limiting implementation of a graphics pipeline, in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services. In a gaming environment, a graphics pipeline is particularly relevant to those computing devices operating in a network or distributed computing environment, and thus graphic pipeline techniques in accordance with the present invention can be applied with great efficacy in those environments.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the graphics pipeline processes of the invention.

FIG. 1 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 14. This network may itself comprise other computing objects and computing devices that provide services to the system of FIG. 2A, and may itself represent multiple interconnected networks. In accordance with an aspect of the invention, each object 10a, 10b, etc. or 110a, 110b, 110c, etc. may contain an application that might make use of an API, or other object, software, firmware and/or hardware, to request use of the graphics pipeline processes in accordance with the invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to a graphics pipeline according to the present invention.

In home networking environments there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge as protocol standards may be interconnected to form a network, such as an intranet, that may be connected to the outside world by way of the Internet. In short, a variety of disparate sources exist for the storage and transmission of data, and consequently, moving forward, computing devices will require ways of sharing data, such as data accessed or utilized incident to program objects, which make use of the graphics pipeline in accordance with the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 1, computers 110a, 110b, etc. can be thought of as clients and computers 10a, 10b, etc. can be thought of as the server where server 10a, 10b, etc. maintains the data that is then replicated in the client computers 110a, 110b, etc., although any computer can be considered a client, a server, or both, depending on the circumstances. Any of these computing devices may be processing data or requesting services or tasks that may implicate the graphics programming techniques specific to an implementation of the graphics pipeline in the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the graphics programming techniques of the graphics pipeline may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 1 illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to implement a graphics interface employing a graphics pipeline of the invention.

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment. Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any one or more of computers 10a, 10b, 110a, 110b, etc. may be responsible for the maintenance and updating of a database 20 or other storage element, such as a database or memory 20 for storing data processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computing Device

Figure 2:
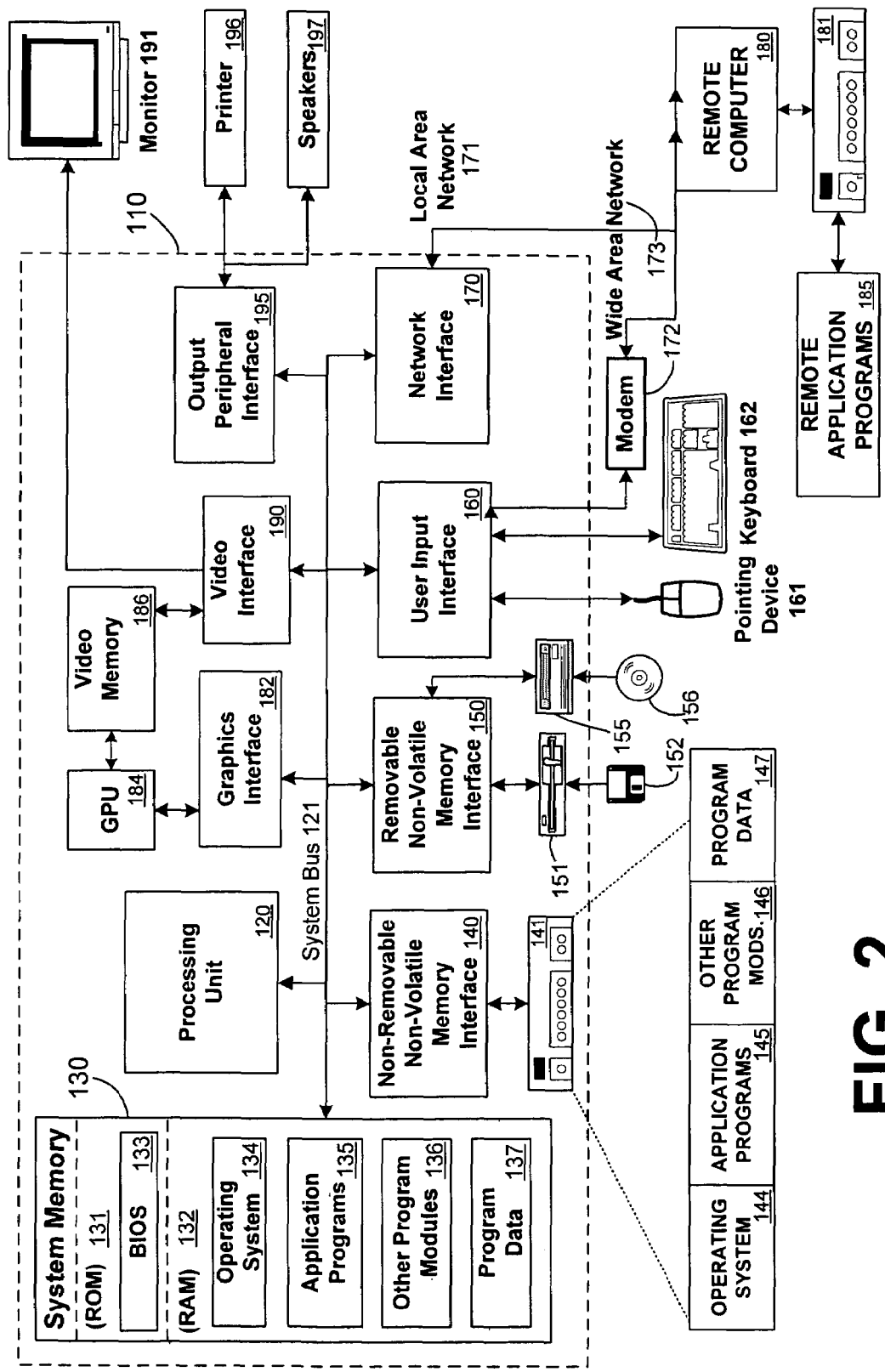
FIG. 2 is a block diagram representing an exemplary non-limiting computing device in which the present invention may be implemented.

FIG. 2 and the following discussion are intended to provide a brief general description of a suitable computing environment in connection with which the invention may be implemented. It should be understood, however, that handheld, portable and other computing devices and computing objects of all kinds are contemplated for use in connection with the present invention, i.e., anywhere where that a GPU exists in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the graphics optimization technique in accordance with the invention.

Although not required, the invention can be implemented via an operating system, for use by a developer of services for a device or object, and/or included within application software that operates in connection with the graphics programming techniques for a graphics pipeline in the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, handheld or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 2 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2 provide storage of computer readable instructions, data structures, program modules and other data for the computer 110. In FIG. 2, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186, wherein the application variables of the invention may have impact. GPUs 184, however, are but one example of a coprocessor and thus a variety of coprocessing devices may be included in computer 110, and may include a variety of procedural shaders, such as pixel and vertex shaders. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software residing on a computing device, one or more portions of the invention may also be implemented via an operating system, application programming interface (API) or a "middle man" object, a control object, hardware, firmware, intermediate language instructions or objects, etc., such that the methods may be included in, supported in or accessed via all of the languages and services enabled by managed code, such as .NET code, and in other distributed computing frameworks as well.

Components of an Exemplary 3D Graphics System

Figure 3:
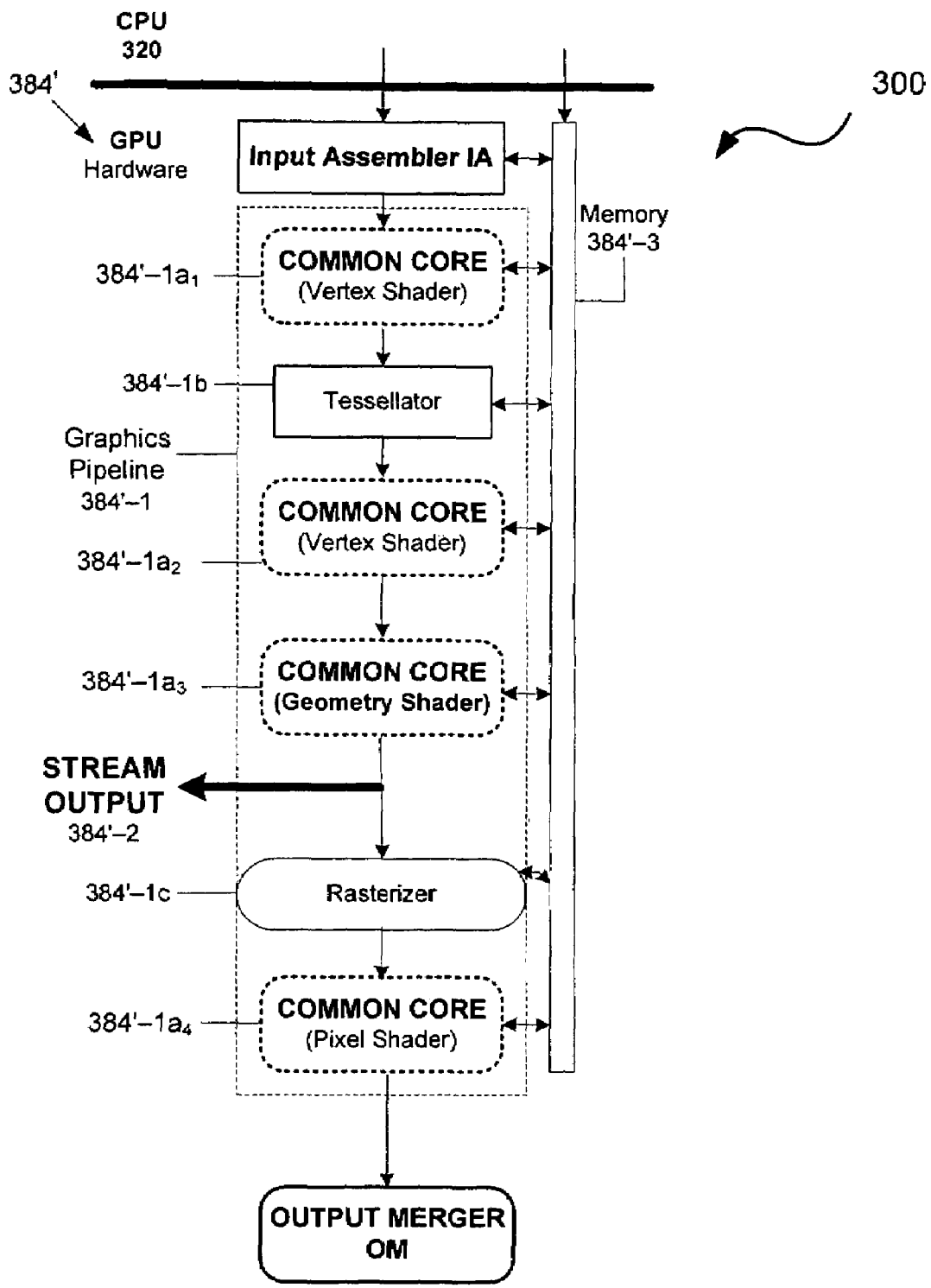
FIG. 3 shows an exemplary graphics system including graphics subunit that includes a graphics processing unit (GPU) and an exemplary hardware configuration for the associated graphics pipeline.

FIG. 3 shows an exemplary graphics system 300 including a graphics subunit, such as a video card, that includes a graphics processing unit (GPU) 384' and an exemplary hardware configuration for the associated graphics pipeline 384'-1. The exemplary 3D Graphics System 300 can include, among other things, a Central Processing Unit (CPU) 320 and a graphics card including a Graphics Processor Unit (GPU) 384' (sometimes referred to Visual Processing Unit (VPU)) including a graphics pipeline 384'-1 (sometimes referred to as the "rendering pipeline"). The GPU 384' can be coupled to the CPU 320 and main RAM, for example, through the AGP or PCI Express bus.

The CPU 320 can generally be any processor, such as, a single chip, multi-core processor running multiple cores (e.g., processors), such as a simultaneous multithreading (SMT) processor which can process or execute several (e.g., one or more) threads at the same time. As used herein, the term "thread" refers to an individual sequence of instructions. As such, simultaneous multithreading refers to the ability for a single processor to handle several threads at the same time. Each core in the CPU 320 may have a Single Instruction Multiple Data (SIMD) unit as an extension to the processor instruction set. The extension may contain special instructions that help to speed up integer and floating-point-intensive applications, when specially coded to take advantage of these instruction sets. Calculations involved in rendering 3D graphics can be mathematically-intensive and rather taxing on the CPU 320. To alleviate the burden on the CPU 320, the GPU 384' is provided to help the computer run more efficiently.

Before graphics are output to a raster display device (e.g., a computer monitor 191), the information used to generate those graphics goes through the GPU '384 and its graphics pipeline 384'-1. The GPU 384' implements the graphics pipeline 384'-1 in hardware to perform billions of geometry calculations per second.

The GPU '384 is very efficient at manipulating and displaying graphics, and its highly-parallel structure makes it more effective than typical CPUs for a range of complex algorithms. The GPU '384 implements a number of graphics primitive operations in a way that makes running them much faster than drawing directly to the screen with the host CPU 320. Lifting this burden from the CPU 320 means that the computer's CPU 320 doesn't have to work as hard to process graphics data (e.g., frees up cycles that can be used for other jobs). By offloading most of the graphics functions to the GPU '384, the CPU can perform even more calculations in order to achieve an immersive, real-time, graphics environment. The GPU '384 is responsible for accelerating the display of graphical elements (e.g., polygons with texture and shading applied to them) on the raster display device (e.g., a computer monitor). The GPU 384' processes raw geometry data to ultimately represent that information as pixels on the monitor 191. The graphics pipeline 384'-1 receives a representation of a 3D scene, efficiently processes that representation by running the representation through a number of processing stages, and renders 3D scenes as 2D raster images at the monitor 191.

The GPU 384' can be implemented as one or more stand-alone microprocessors which are configured to process real-time 2D and 3D graphics. The GPU 384' can sit on a separate graphics card (from the motherboard) for processing for 2D and/or 3D computer graphics and then rendering 2D or 3D images. The GPU 384' can access high-performance VRAM directly on the graphics card. Alternatively, the GPU 384' may be implemented by integrating it into one of the chips on a PC motherboard so that the GPU 384' can use the main memory as a frame buffer and the CPU to aid in frame rendering. The GPU 384' can be used, for example, as a dedicated graphics/video rendering device for a personal computer or game console.

In 3D graphics rendering, the graphics pipeline 384'-1 refers to the various stages of processing (e.g., the sequence of steps) that the GPU 384' carries out to transform three-dimensional image data (e.g., the vertices, textures, and other data) from an application into an actual image that is displayed on a two-dimensional screen. The properties provided per vertex can include, for example, x-y-z coordinates, RGB values, translucency, texture, reflectivity and other characteristics.

The different stages in the graphics pipeline 384'-1 are responsible for processing information that is initially provided as properties at the end points (vertices), or control points of the geometric primitives, to generate the image that is eventually rendered. As used herein, the term "primitive" can refer to a collection of vertices that form a single 3D entity. The simplest primitive is a collection of points in a 3D coordinate system, which is called a point list. The typical primitives in 3D graphics are lines and triangles. Other types of primitives can include, for example, a line, line list, line strips, a triangle, triangle lists, triangle strips, and triangle fans. Often, 3D primitives are polygons. A polygon is a closed 3D figure delineated by at least three vertices. The simplest polygon is a triangle. Triangles can be used to compose most polygons because all three vertices in a triangle are guaranteed to be coplanar. Triangles can be used to form large, complex polygons and meshes.

Within the graphics pipeline 384'-1 all stages are working in parallel. 60 By reconfiguring the graphics pipeline 384'-1 different visual effects can be achieved. For example, the graphics pipeline might receive the geometry to be displayed (e.g., list of triangles), and then perform the necessary geometric transformations on it (e.g., rotations, translations etc.), calculate the color for the geometry to be displayed, and then render the geometry to be displayed.

Pipeline Stages

In general, the graphics pipeline 384'-1 may comprise the following logical stages: input assembler (IA), vertex shaders 384'-1$a_1$ and 384'-1$a_2$, a geometry shader 384'-1$a_3$ having an associated stream output 384'-2, the rasterizer 384'-1$c$, a pixel shader 384'-1$a_4$, and the output merger (OM). The graphics pipeline 384'-1 can be configured to optimize the use of resources, balance the workload in the graphics pipeline 384'-1, allow access to calculated information with IEEE compliant integer or floating point values, and provide additional programmability.

The exemplary non limiting embodiment of the graphics pipeline 384'-1 employs dynamically configurable common shader core(s) comprising a number of units or processing cores 384'-1$a$ that can be configured in various configurations. The common shader core allows simplified optimization as identical hardware units (for the different shaders) provide load balancing by reconfiguring, or disabling a shader as part of the pipeline when it is not needed, thus freeing up resources for stages that remain active.

These processing cores 384'-1$a$ can be read into memory and write out from memory in various patterns depending upon the particular application being executed. Depending on its configuration, each of the units 384'-1$a$ can be used to perform a vertex shader stage, a geometry shader stage and/or a pixel shader stage. This allows the common shader cores to be scheduled to different stages (or functional blocks) of the graphics pipeline 384'-1 on demand to allocate pixel shaders, geometry shaders and vertex shaders in a manner that is best suited for the tasks being requested of the pipeline 384'-1. Any stage may be dynamically enabled or disabled, and configured or reconfigured, thereby freeing and respecializing resources for stages that are active. As such, the underlying resources of the graphics chip can be optimized for the tasks being asked of the graphics chip.

The particular configuration of the graphics pipeline 384'-1 shown in FIG. 3 includes a plurality of shared programmable cores or common core elements 384'-1$a$, such as vertex shaders 384'-1$a_1$ and 384'-1$a_2$, a geometry shader 384'-1$a_3$ having an associated stream output 384'-2 and a pixel shader 384'-1$a_4$. These different functional stages operate in parallel serving as separate special-purpose processors. Depending upon that particular implementation, there can be additional or fewer pipeline stages that are shown in FIG. 3. Moreover, during the processing of certain vertex and primitive data, only some of the pipeline stages shown may actually process that data before an output is displayed on a computer monitor.

Input Assembler (IA)

The graphics pipeline 384'-1 receives incoming primitive data from and vertex data from an application and passes it through the various pipeline stages before an output is displayed on a computer monitor or screen. The input assembler (IA) introduces vertex data, such as, triangles, lines or points into the graphics pipeline 384'-1 by pulling source geometry data out of vertex memory buffers and index memory buffers.

"Non-indexed" or "indexed" rendering can be used to produce addresses from which to fetch vertex data in memory, and subsequently assemble the results into vertices and primitives.

"Non-indexed" rendering refers to the sequential traversal of vertex buffer(s) containing vertex data, originating at a start offset at each buffer binding. Vertex memory buffers (not shown in FIG. 3) can receive untransformed model vertices from an application and store them as vertex data. The buffers are each bound to an individual input slot. The layout of data across all the buffers is specified by an input declaration, in which each entry defines an "element" with an input slot, a structure offset, a data type, and a target register (for the first active shader in the pipeline). The vertex memory buffers can contain any vertex type. Vertex data can come from multiple buffers, accessed in an "Array-of-Structures" fashion from each buffer. A given sequence of vertices is constructed out of data fetched from buffers. Various primitive topologies are available to make the sequence of vertex data represent a sequence of primitives. Example topologies are, for example, point-list, line-list, triangle-list, triangle-strip.

"Indexed" rendering refers to the sequential traversal of a single buffer containing scalar integer indices, originating at a start offset into the buffer. The data to be processed by the graphics pipeline 384'-1 may also be assigned an index. Index memory buffers (not shown in FIG. 3) receive raw, indexed geometric primitive data from an application including points, lines, triangles, and polygons. These geometric primitives can be referenced in the vertex data with index memory buffers. Each index indicates where to fetch data out of buffer(s) containing vertex data. The index memory buffers contain index data, or indices, which are integer offsets into vertex memory buffers and are used to render primitives using techniques which draw indexed primitives from a current set of data input streams. Because an index buffer contains indices, an index buffer can not be used without a corresponding vertex buffer. Indexing can be useful in a number of situations. For instance, an index value can be used, for example, as part of a video memory addressing scheme while processing data (e.g., the index may signify where and when to retrieve (and/or write to) portions of video memory for processing). The programs downloaded to the shader can thus programmatically use the index values associated with the graphics data while retrieving or writing to video memory, and also while processing graphics data.

Vertex Shader Stage

The input assembler (IA) sends data to the first common core 384'-1$a_1$. In this embodiment, the first common core 384'-1$a_1$ is configured as a vertex shader stage. The vertex shader stage operates on or processes streams of vertices (from video memory of the graphics pipeline) that are specified for algorithmic transformation via a program from the host. Among other things, a vertex shader can receive a variety of inputs such as uniform variables and vertex attributes. Uniform variables are constant values for each shader invocation. By contrast, vertex attributes are per-vertex data (a special case of variant variables) such as vertex position.

Vertex shaders generally operate on a single input vertex and produce a single output vertex, where a "vertex" refers a point of intersection in 3D space usually defined by its location using x-, y-, and z-coordinates. The vertex shader stage can allow each geometric vertex to be processed by a short program before it is projected onto the screen. For instance, the vertex shader stage can manipulate an object's position in 3-D space by defining techniques to compute vector space transformations and other linearizable computations. For example, the vertex shader stage can apply computations of positions, colors and texturing coordinates to individual vertices, and can perform operations such as transformations, skinning, and lighting. Some examples of vertex shader's functionalities include arbitrary mesh deformation and vertex displacements in general, computing linearizable attributes for later pixel-shaders such as texture coordinate transformations.

Tessellator Stage

The data is then sent to a tessellator 384'-1$b$, which performs tessellation on the data. Tesselation generally refers to a process which involves covering of a bounded geometric region without gaps or overlaps by congruent plane figures of one type or a few types. Following the tessellator 384'-1$b$, there is another common core in the pipeline, which can be used to perform post tessellation vertex shading on the data. The tessellator steps, in this embodiment, are optional.

Geometry Shader Stage

The second common core is followed by a third common core that is configured as a geometry shader, 384'-1$a_3$. The geometry shader 384'-1$a_3$ allows for programming primitives as well as the generation of new geometry. The geometry shader 384'-1$a_3$ can operate on different types of "primitive" input including vertices/points, lines (sets of two vertices), and triangles (sets of three lines), and generate new geometry inside the pipeline based on the primitives being input. The geometry shader's inputs are the vertices for a full primitive (two vertices for lines, three vertices for triangles, or single vertex for point) plus the vertex data for the edge-adjacent primitives (an additional two vertices for a line, an additional three for a triangle). For example, the geometry shader 384'-1$a_3$ can receive one primitive and output either zero, one or multiple primitives. The geometry shader 384'-1$a_3$ can output multiple vertices forming a single selected topology. Some examples of the output include topologies like a triangle strip, a line strip or a point list. The number of primitives emitted can vary within any invocation of the geometry shader 384'-1$a_3$.

The geometry shader 384'-1$a_3$ may take in one primitive, and output multiple primitives, optionally processing adjacent primitives, such as adjacent vertices. In other words, the geometry shader 384'-1$a_3$ enables operations on the entire primitive not just by itself, but also in the context of some additional nearby vertices. One line segment in a polyline, for example, may be processed with the ability to read the vertices before and after that segment. One application of this capability (e.g., to process adjacent vertices of a primitive) is that the geometry shader 384'-1$a_3$ is capable of taking information about neighboring points in 3-D geometric space into account in current calculations.

Algorithms that can be implemented in the geometry shader 384'-1$a_3$ can include: point sprite or wide line tessellation, fur/fin generation, shadow volume generation, single pass rendering to multiple texture cube faces, and set up barycentric coordinates as primitive data (so that the pixel shader can perform custom attribute interpolation).

To perform point sprite tessellation, the shader would take a single vertex and generate four vertices, or two output triangles representing four corners of a quadrilateral, while performing wide line tessellation, the shader receives two line vertices, and generates four vertices for a quadrilateral representing a widened line. Additionally, the geometry shader may utilize adjacent line vertices, to perform mitering on the line end points.

The geometry shader can also be used to generate fur or fins, this is not limited to fur or fin generation, but encompasses any additional vertices added in a third direction of a single topology. Examples include hair, scales, grass, etc., where primitives describing a geometry are fed to the geometry shader, and the geometry shader grows the geometry arbitrarily to supplement the shape. Thus, with hair, for instance, based on triangles input to a geometry shader, the geometry shader can add a few vertices that represent hair at each vertex. Advantageously, because a stream of triangles to the geometry shader includes information about the neighbors of a vertex, the proximity and properties (color, depth, etc.) of the geometry of the vertex's neighbors can be taken into account during processing. Another exemplary non limiting use of the geometry shader includes shadow volume generation where the adjacency information is used to decide whether to extrude. Furthermore, an application may want to generate some geometry, like a fin or fur and extrude shadow volumes out of that. In such cases, multi-pass functionality of the geometry shader would be employed using the ability output a data stream and circulate it back through the use of the stream output.

In this exemplary non-limiting embodiment, the output from a geometry shader $384'$-$1a_3$ goes to either the rasterizer $384'$-$1c$ for rendering and/or to a buffer via stream output (SO) $384'$-2. Turning the stream output (SO) $384'$-2 "on" does not stop the rasterization functions of the graphics graphics pipeline $384'$-1; it merely amplifies the power of the graphics pipeline $384'$-1 by providing more programmatic power to the developer.

Stream Output

The stream output (SO) $384'$-2 serves like a "tap" in the graphics pipeline $384'$-1 which can be turned on and off even as data continues to flow down to the rasterizer $384'$-$1c$. The stream output (SO) $384'$-2 may be tapped into anywhere inside the graphics pipeline $384'$-1 prior to the data reaching the frame buffer for rasterization.

When the stream output (SO) $384'$-2 is off, the stream output (SO) $384'$-2 has no effect on the pipeline. In other words, the stream output (SO) is optional; an application may merely allow the pipeline to send the data through without reading the data to a stream output buffer. Furthermore, the stream output buffer is one example of the type of memory that can be used to store the streamed data. There may be times when different types of memory may be used for such functionality, like cache memory in a microprocessor.

When turned on, the stream output (SO) $384'$-2 allows programmers to "tap" into the pipeline while the data is inside the pipeline, and provide that data to another location.

For instance, the stream output (SO) $384'$-2 can stream primitives to one or more output buffers for re-use elsewhere in the pipeline, enabling the application of recursive programmatic algorithms inside the pipeline. Data sent out via stream output (SO) $384'$-2 can be concatenated to buffer(s). The data in the buffer(s) can then be recirculated to graphics pipeline $384'$-1 inputs on subsequent passes. For example, the data received at the stream output (SO) $384'$-2 can be written to a buffer or memory for retrieval by the host or other operation.

Alternatively, the data received at the stream output (SO) $384'$-2 can be recirculated (e.g., fed back or fed forward) to another entity within the pipeline, such as, the input assembler (IA), vertex shaders $384'$-$1a_1$ and $384'$-$1a_2$, geometry shader $384'$-$1a_3$, or the pixel shader $384'$-$1a_4$ to perform recursive or looping functionality. The stream output (SO) $384'$-2 can allow data to be recirculated to other parts of the graphics pipeline $384'$-1 programmatically (e.g., the programmer can download a program to the GPU which performs recursive operations on the data (recircling data through the same algorithms recursively) or otherwise loop through the data a prefixed number of times). For instance, the stream output (SO) $384'$-2 can be used to recirculate the data to the shader itself thereby allowing multi-pass operations to be performed on the given data. This can enable programmatic recursive and looping algorithms on graphics data. Another way to recirculate data is to send it through the pipeline again inputting the data to the input assembler (IA) again.

Furthermore, if necessary, the information can be streamed out while the same data goes to the rasterizer, thus not slowing down the rendering of data, or enabling the display of the image as it undergoes a transformation based on recursive algorithmic elements operating on the data.

Rasterizer

The next component of the graphics pipeline $384'$-1 is a rasterizer $384'$-$1c$. The rasterizer $384'$-$1c$ is not necessarily a stage in the graphics pipeline $384'$-1, but rather an interface between various pipeline $384'$-1 stages. The rasterizer $384'$-$1c$ assumes input positions are provided in clip-space and performs a significant set of fixed function operations which may include clipping, perspective divides, viewport or scissor selection, primitive setup, and determining how to invoke pixel shader $384'$-$1a_4$. Many of these functions can be adjusted by software developers.

Pixel Shader Stage

Following the rasterizer is a fourth common core, $384'$-$1a_4$, and it functions as a pixel shader where it takes one pixel and outputs the pixel at a position. A pixel shader can allow each pixel to be processed by a short program that can include, for example, image textures (or texture data) as inputs. A pixel shader can allow developers manipulate colors, textures or even shapes by altering the lighting, color and surface at a pixel level. Pixel shaders can be used to alter the lighting, color and surface of each pixel. This in turn affects the overall color, texture and shape of 3-D objects built from these pixels.

Input data available to the pixel shader $384'$-$1a_4$ includes vertex attributes that can be chosen, on a per-element basis, to be interpolated with or without perspective correction, or be treated as constant per-primitive. Outputs generated by the pixel shader $384'$-$1a_4$ can be one or more 4-vectors of output data for the current pixel location, or no color (if pixel is discarded). A partial list of effects that pixel shaders make possible includes: per-pixel reflections, per-pixel lighting using Phong-style shading or DOT3 effects, and procedural textures.

Output Merger

At the output merger (OM), the final step in the logical graphics pipeline $384'$-1, other pixel processing functions can be performed to render the final pixels. These functions can include, for example, binding of output resources (render targets), modifying pixel color values with a scissor test, visibility determination, through depth bias and/or stencil buffer techniques, or applying functions such as alpha blending or fog, shadowing, bump mapping, environment mapping, antialiasing, writing or blending of output(s) to render target(s), which may be one of many resource types, and multiple-element textures. After performing these functions on the data, the data is ultimately processed further and eventually displayed on a monitor, 191.

Common Shader Core for Shaders in the Pipeline

Figure 4:
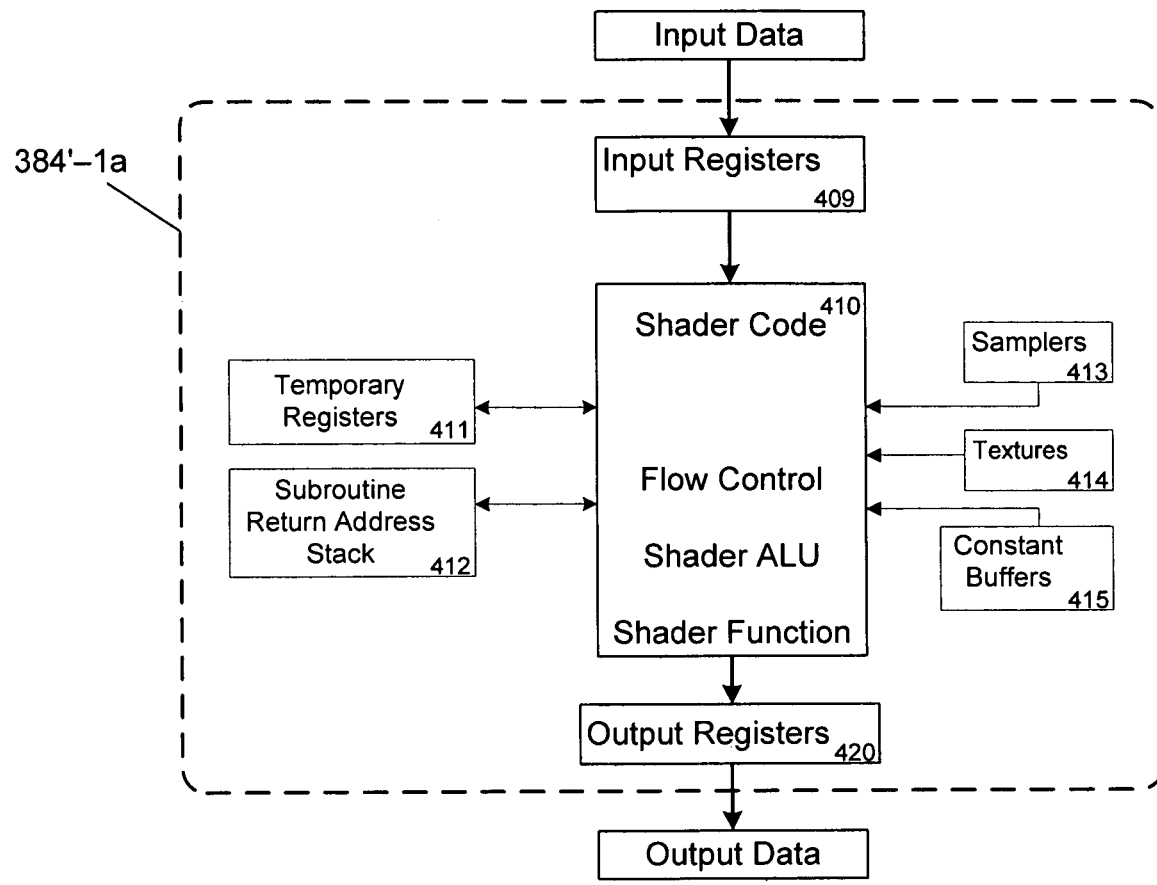
FIG. 4 is a block diagram representing an exemplary, non-limiting embodiment of the hardware and software components of a common shader core.

FIG. 4 is a block diagram representing an exemplary, non-limiting embodiment of the hardware and software components of a common shader core $384'$-$1a$. The common shader core $384'$-$1a$ can be used, for example, to implement either the vertex shaders $384'$-$1a_1$ and $384'$-$1a_2$, the geometry shader $384'$-$1a_3$, or the pixel shader $384'$-$1a_4$, shown above in FIG. 3.

The common shader core $384'$-$1a$ receives the input data from either the input assembler (IA) unit, a previous stage which may be from anywhere in the graphics pipeline $384'$-1, or in some cases, from a specialized input source.

The input data can then be temporarily stored in input register(s) 409. The input register(s) 409 may be, for example, a dynamically indexable array. In the case of a geometry shader, the input register(s) may be a two dimensional (2D) array which arranges the inputs, for example, as [vertex] [element] pairs.

The input data is then sent to the shader code 410. The shader code 410 provides flow control mechanisms, an arithmetic logic unit (ALU) that handles vector floating point and integer arithmetic, memory fetch or sample operations, and a shader function or program that specifies the particular transformations to be performed on the input data. The shader code 410 can also receive a number of other inputs, such as, information from the samplers 413, the textures 414 and the constant buffers 415. The shader code 410 also has two way communication with the temporary registers 411 and the subroutine return address stack 412.

Samplers 413, textures 414, and constant buffers 415 are "resources" that are set in a pass block based on the dependency information extracted from the shaders.

The shader code 410 receives samples from the samplers 413 that define how to sample textures. However, memory can also be read without filtering and the sampler is not necessary in every embodiment. Because sampler objects are statically created, it enables the hardware to maintain references of multiple samplers in the flight of the pipeline without having to track changes or flush the pipeline (because the sampler objects maintain their definitions and are not modified).

The shader code 410 receives texture information from the textures 414. The textures 414 work with the shader code to provide texture sampling.

The CPU generates shader constants that can be used to reconfigure a particular shader program. The shader code 410 receives shader constants from the constant buffers 415. Constant buffers 415 are provided to aggregate or group certain variables (or "shader constants") in memory on the GPU. In other words, instead of using an array of constant registers (c0 . . . cN) to store constant input values, constant buffers 415 can be used to group numeric shader constant values together. The constant buffers are optimized for lower latency access and more frequent updates than textures 414. The constant buffers 415 can allow a developer to set a particular group of constants all at the same time. The constants can be arranged in any particular order that the developer desires. Grouping shader constants together in a constant buffer can result in certain performance benefits. For example, if two shader constants are typically modified and used together at the same time (e.g., have the same state in each scenario), then those shader constants can be put into a particular constant buffer.

In one implementation, for each stage in the graphics pipeline, there are 15 slots for constant buffers that can be active. In shader code, a cb# register is a placeholder for a constant buffer at "slot" #. A constant buffer is accessed in a shader using: cb#[index] as an operand to shader instructions, where 'index' can be either a non-indexable (r#) or statically indexed (x#) containing a 32-bit unsigned integer, an immediate 32-bit unsigned integer constant, or a combination of the two added together (e.g., "mov r0, cb3[x3[0].x+6]" represents moving Element 7 from the ConstantBuffer assigned to slot 3 into r0, assuming x3[0].x contains 1). Applications are able to write shader code that reads constants in whatever pattern and quantity desired, while still allowing different hardware to easily achieve the best performance possible.

The temporary registers 411 serve as temporary storage. In an exemplary, non limiting embodiment, the temporary registers 411 can hold any non-indexable or indexable arrays of any size and quantity that are needed up to the limit of the temporary storage.

The subroutine return address stack 412, in this particular, non limiting exemplary embodiment, is a fixed height. Furthermore, the stack is hidden from direct shader access and transparently stores return addresses only. It also permits the definition of recursive algorithms.

After the code has passed through the shader code 410, the data goes to output registers 520. The output registers 520, in this exemplary non limiting embodiment, are made of a dynamically indexable array of four vector outputs. Furthermore, some stages may have additional specialized outputs.

Depending on which stage the common shader core 384'-1a is being implemented at in the graphics pipeline 384'-1, the output data can then be output to: the next shader stage, if present; as a stream output (SO) to memory or other location; or to an output merger (OM) or rendering stage.

The data structures listed can be changed from a 1 D array to a 2D array or a list. All data structures may change depending on the size and storing capabilities of the GPU. Within the GPU, changes to the storage limits and fixed heights may occur due to dynamic allocation, and application of compression algorithms to information to conserve space. The samplers and constant buffers may behave like the textures, however as resources change, the definitions of these components may be modified. If textures are redefined, both samplers and constant buffers can change and are not limited to just the texture functions. Furthermore, all the data structures can implement new optimization algorithms for speed and utility purposes. The various embodiments described herein are mere examples of graphics pipeline using common cores, which can be dynamically configured to provide functionality of a vertex shader, a pixel shader and a geometry shader.

Figure 5:
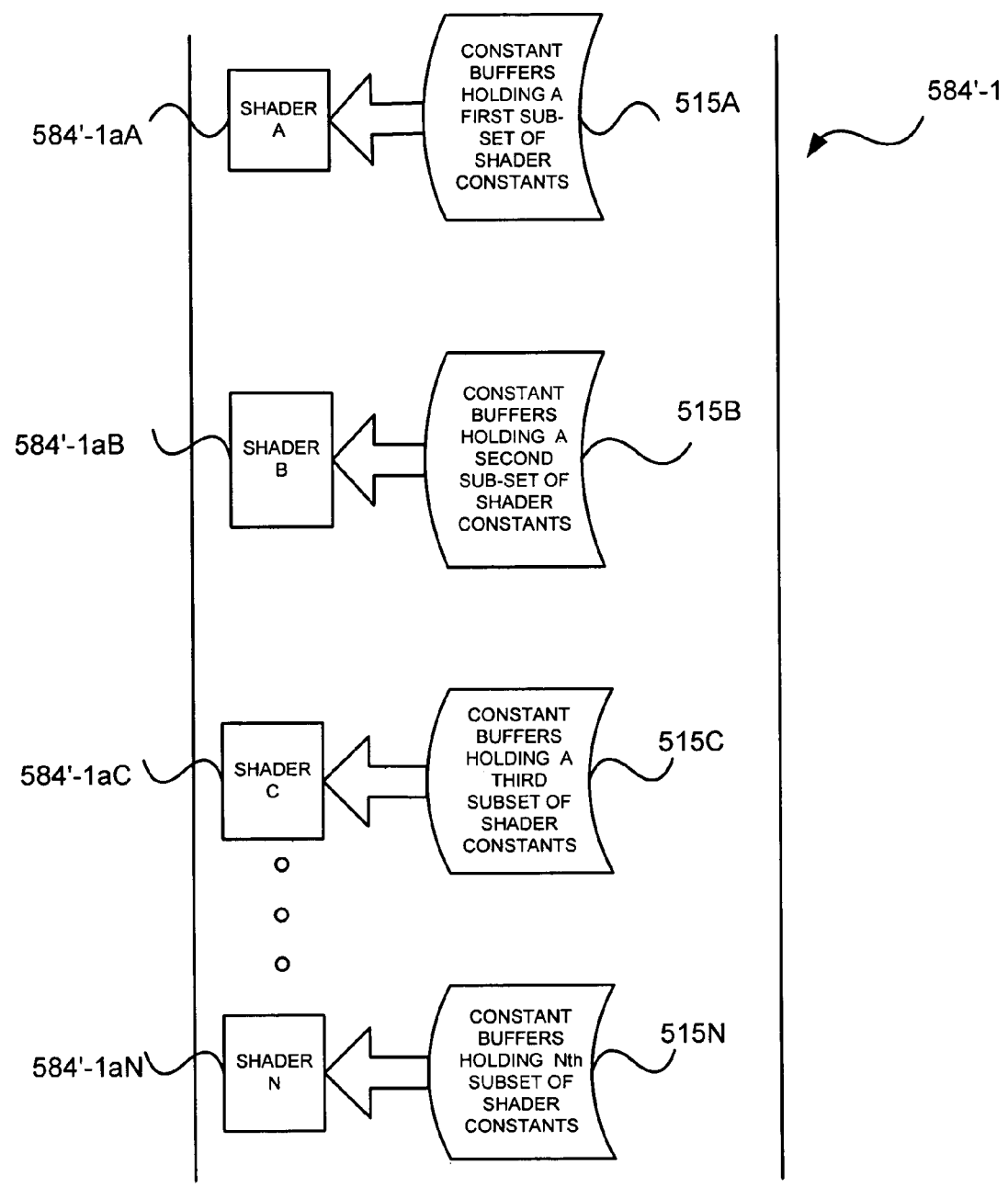
FIG. 5 is a block diagram representing a number of different shader programs in an exemplary non limiting graphics pipeline.

FIG. 5 is a block diagram representing a number of different shader programs 584'-1a A-N in an exemplary non limiting graphics pipeline 584'-1. Each of the different shader programs 584'-1a A-N has constant buffers 515A-N associated therewith. Each of the constant buffers 515A-N holds sub-sets of shader constants. For example, constant buffer 515A might hold a first sub-set of shader constants, constant buffer 515B might hold a second sub-set of shader constants, and constant buffer 515C might hold a third sub-set of shader constants.

FIG. 6 illustrates an exemplary non-limiting chart having columns representing each of the particular shaders (A . . . N) and rows illustrating particular shader constants (C1-C5) which are used in the particular shader constant buffers which are used in conjunction with each of the particular shaders (A . . . N). For simplicity of illustration, the examples provided in FIG. 6 show that there are five (5) possible shader constants (C1-C5) and that each of the particular shaders (A . . . N) has a single constant buffer that can hold up to 5 shader constants. However, it will be appreciated that in most practical implementations, there a much larger number of possible shader constants (e.g.,), that each of the particular shaders (A . . . N) will typically have a larger number of constant buffers, and further that each of the constant buffers would be configured to hold a far larger number of shader constants than the those shown in FIG. 6. For example, depending on the complexity of a particular application, application developers can specify an unlimited number of constant buffers, and in one practical implementation, up to 16 of these constant buffers can be bound to a shader at any given time. Moreover, each constant buffer can include, for instance, up to 40964-channel*32-bit elements. Thus, based on the number of constant buffers and shader constants in each constants buffer, it can be appreciated that it would be desirable to minimize overhead of setting shader constants to the various shaders.

FIG. 6 shows that, at any given time, each particular shader program (A . . . N) and each of the shader constants (C1 . . . C5) can be designated as having one of three different states which describe a particular shader constants use or non-use relative to a preceding constant buffer. For example, each particular shader constant (C1-C5), in each particular constant buffer, can be designated as being in one of:

a non-consumed state which indicates that the particular shader program does not consume the particular shader constant (e.g., the shader program does not use that particular constant at all), a consumed stale state which indicates that the particular shader program is consuming a stale value of the particular shader constant previously consumed by another shader (e.g., the particular shader program uses a stale value of the particular shader constant consumed previously by another shader; shader constant has already been modified by the application for consumption by a previous shader invocation), and a consumed fresh state which indicates that the particular shader program is the first shader program to (freshly) consume the newly set value of the particular shader constant. Using these designations, a particular shader constant must be in the consumed fresh state (e.g., freshly consumed by a particular shader) before it can be in the consumed stale state (e.g., stale consumed by another particular shader).

Thus, with respect to the exemplary shader constant configurations shown in FIG. 6, each of the shader constants can be designated as having a status or state relative to its use or non-use in a preceding constant buffer.

For instance, the constant buffer (in shader A) presently holds two constants (C1, C2), and both are designated as being in a consumed fresh state since shader A is the first shader in the sequence of shaders (A . . . N) to freshly consume the newly set value of the particular shader constants (C1, C2). The other three constants (C3-C5) are designated as being in a non-consumed state since the particular shader does not consume those particular shader constants (C3-C5).

The constant buffer (in shader B) presently holds four constants (C2, C1, C4, C3). Of those, two constants (C4, C3) are both designated as being in a consumed fresh state since shader B is the first shader in the sequence of shaders (A . . . N) to freshly consume the newly set value of the particular shader constants (C4, C3). Constants (C1, C2) are both designated as being in a consumed stale state since shader B is consuming a stale value of those particular shader constants (e.g., C1, C2 were previously consumed by shader A). In other words, shader B does not really modify shader constants C1 and C2 since shader constants C1 and C2 are in the same state as they were previously and are therefore designated as consumed stale. The other constant (C5) is designated as being in a non-consumed state since shader B does not consume that particular shader constant (C5).

The constant buffer (in shader C) presently holds three constants (C5, C2, C1). All three constants (C5, C2, C1) are designated as being in a consumed fresh state since shader C is the first shader in the sequence of shaders (A . . . N) to freshly consume the newly set value of the particular shader constants (C5, C2, C1). The client must have set new values for C1 & C2 between the execution of S2 and S3. Thus, the new values are consumed freshly by S3 even though S1 & S2 have consumed older values of C1 & C2 before. The other constants (C3, C4) are designated as being in a non-consumed state since shader C does not consume those particular shader constants (C3, C4).

The constant buffer (in shader N) presently holds three constants (C1, C2, C5). These constants (C1, C2, C5) are designated as being in a consumed stale state since shader N is consuming a stale value of those particular shader constants (e.g., C1, C2, C5 were previously consumed by shader C). The other constants (C3, C4) are designated as being in a non-consumed state since shader N does not consume those particular shader constants (C3, C4).

Thus, in some cases, many of the shaders will share the same information. For example, if there is a light that is lighting all the objects in a particular scene, the position of the light will be the same in every shader program in that particular scene, and the position of the light will be read by every shader that does a lighting computation. When multiple shaders are using the same shader constants, it is inefficient to repeatedly send the same shader constants down the pipeline multiple times to the different shaders since bandwidth between the CPU and the GPU is relatively limited.

Optimal Arrangement of Shader Constants

Techniques are provided for determining, based on actual behavior of a particular application at run-time, an optimal size of shader constant buffers, and the optimal shader constants in those particular shader constant buffers. Given a set of shaders and shader constants, the application is run through each of the particular shaders and the shader constants used by each constant buffer can be observed. An optimization algorithm continuously evaluates the current state of shader constants used in each of the constant buffers, analyzes the shader constants used in each constant buffer, and determines an optimal organization (e.g., selection and arrangement) of shader constants in each constant buffer.

This algorithm allows observation of which constants are being set and which values are being updated based on the actual behavior of the application. By running a particular application it can be determined which constants seem to change and which do not by observing the different combinations of the shader constants used in each constant buffer as the application executes. By observing the run time environment, it can be determined which constants need to be changed. As a particular application runs usage of the different constants in each of constant buffers can be recorded. Once the application runs for a certain amount of time, certain metrics can be determined. Usage patterns are analyzed and the different metrics can be used to come up with an optimal distribution of these constant buffers. The constants used in each constant buffer of each of the different shaders can be optimized based on these metrics.

Figure 7:
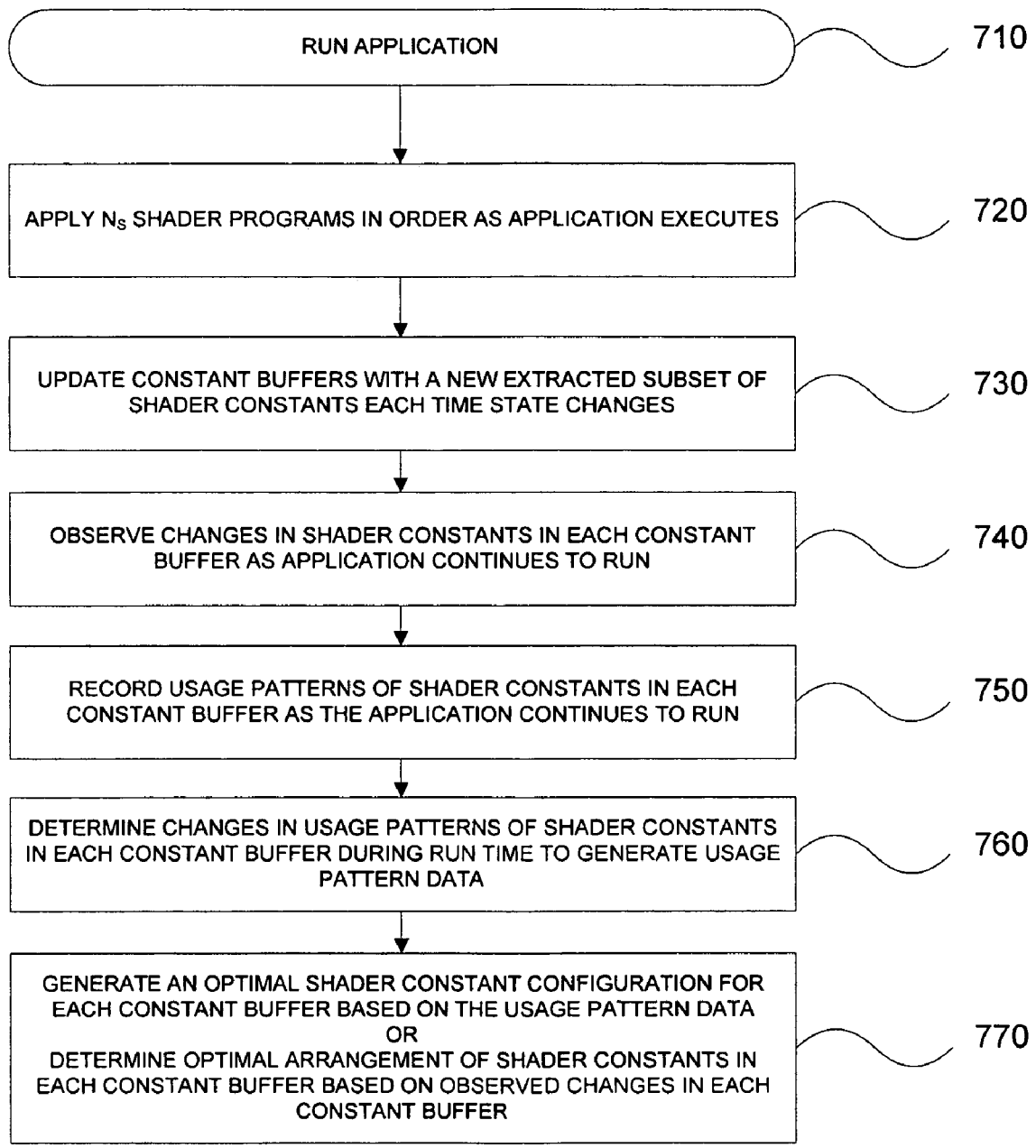
FIG. 7 illustrates an exemplary non-limiting flow diagram for determining optimal placement of shader constants in each of a number of constant buffers based on observed runtime behavior of a particular application running on a CPU.

FIG. 7 illustrates an exemplary non-limiting flow diagram 700 for determining optimal placement of shader constants in each of a number of constant buffers based on observed runtime behavior of a particular application running on a CPU. These techniques could be applied, for example, as part of an effects software layer to optimize performance of a graphics pipeline comprising a number ($N_s$) of shader programs. Each of the shader programs has at least one of constant buffer associated therewith and in many cases a number of constant buffers associated therewith. In this situation, each constant buffer is configured to hold a particular subset of shader constants from a pool ($N_c$) shader constants. The subsets of shader constants can have variable sizes in each case.

The process 700 begins at step 710 by running the particular application. At step 720, the number ($N_s$) of shader programs (not necessarily unique) can be applied in chronological order as the particular application executes. For example, in one implementation, as an application executes, the client program applies a number ($N_s$) of shaders, and the shaders pull subsets of constants from a pool ($N_c$) of constants. The number ($N_s$) of shaders are not necessarily unique, and can be applied, for example, in chronological order. Optionally, the developer may have also placed these shader constants into constant buffers with a particular arrangement which can be used as an initial guess as to the optimal placement of constants into respective buffers or "affinity." This lets a developer hint to the system which constants should be placed in which buffers, all things being roughly equal. Since the optimization procedure uses a heuristic based on minimizing the number of bytes copied and the number of constant buffers locks, another heuristic can be added that adds a cost for moving a constant out of the original buffer the developer placed it in. This essentially creates an affinity for a constant to stay in its current buffer unless there is a huge cost to doing so.

For example in the initialization phase, all the constants could be put into one buffer, the application can then be run, and the constant buffers will update each time state changes. "State" refers to an array of shader constants (numbers or values) that is being interpreted by the shader program. Interspersed between shader apply calls are a number of Variable->SetValue( ) calls which set data into a shader constant. In other words, between the shader apply calls (equivalently, between columns of the table in FIG. 6), it is inferred that the developer is changing the values of various constants by using material management APIs (FX). (This is why in FIG. 6 the values for C1 & C2 are consumed fresh in Shader C even though they were already consumed stale by the previous Shader B). The application "produces" values and the shaders "consume" the values. The values are not always 1-to-1; sometimes a program might set a value multiple times before applying (which generates a performance warning) and sometimes a value might be set once and used intact across multiple shaders. In the latter case, frequency of updates can be inferred (e.g., which shaders use which constants in common with other shaders).

At step 730, each time state changes, each constant buffer is updated with the shader constants that need to be modified to execute a particular shader program.

Figure 8:
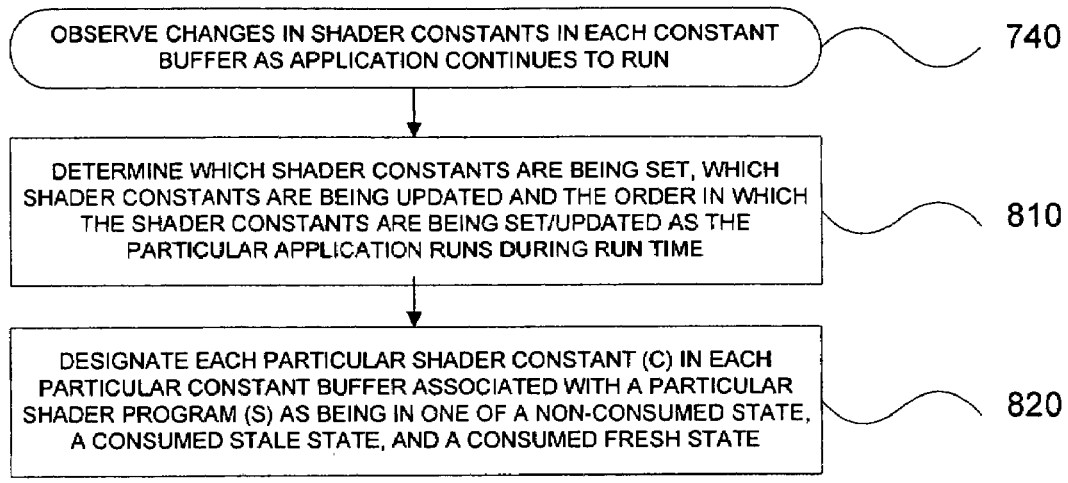
FIG. 8 illustrates an exemplary non-limiting flow diagram for observing changes in the shader constants in each constant buffer as the particular application runs during run time.

As the particular application continues to run (e.g., during run time), at step 740, changes in the shader constants in each constant buffer are observed. FIG. 8 illustrates an exemplary non-limiting flow diagram 740 for observing changes in the shader constants in each constant buffer as the particular application runs during run time. At step 810, a determination is made as to which shader constants are being set, which shader constants are being updated and the order in which the shader constants are being set/updated as the particular application runs during run time. At step 820, each particular shader constant in each particular constant buffer associated with a particular shader program can be designated as being in one of a non-consumed state, a consumed stale state, and a consumed fresh state.

Referring again to FIG. 7, at step 750, usage patterns of shader constants in each constant buffer are recorded as the particular application continues to run. In one implementation, a table (T) can be generated comprising a number of entries ($N_s \times N_c$) based on the $N_s$ shader programs and the pool ($N_c$) shader constants. Each entry (T[s][c]) in the table (T) corresponds to the state of a particular shader constant (c) in a particular constant buffer associated with a particular shader program (s).

Figure 9:
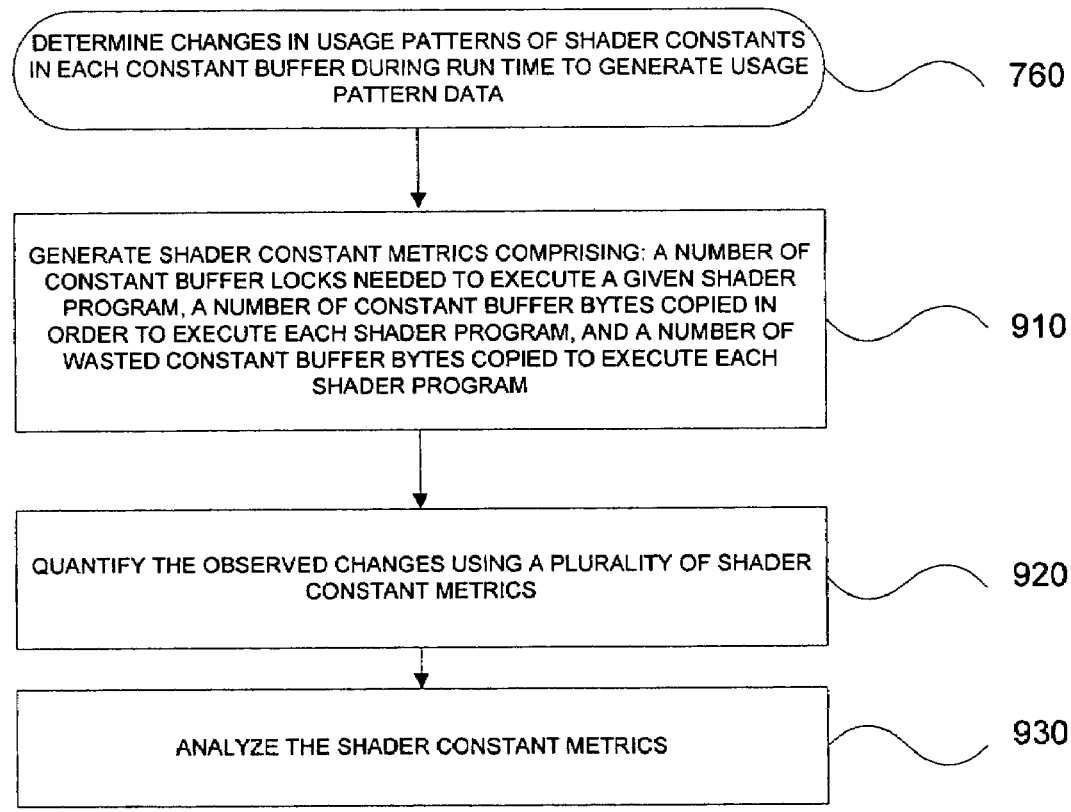
FIG. 9 illustrates an exemplary non-limiting flow diagram for determining changes in usage patterns of shader constants in each constant buffer (during run time) to generate usage pattern data.

At step 760, changes in usage patterns of shader constants in each constant buffer can be determined (during run time) to generate usage pattern data. In one implementation, the shader constant metrics can be analyzed to determine the changes in usage patterns of shader constants in each constant buffer (during run time) to generate usage pattern data. FIG. 9 illustrates an exemplary non-limiting flow diagram 760 for determining changes in usage patterns of shader constants in each constant buffer (during run time) to generate usage pattern data. At step 910, once the table (T) has been generated, shader constant metrics can be generated. Given any arrangement of the shader constants into mutually exclusive constant buffers (whether it be the initial guess provided by the original arrangement or whether it be some given configuration suggested by the optimizer), a number of shader constant metrics can be computed. The shader constant metrics may comprise, for example:

a number of constant buffer updates needed to execute a given shader program (NumCBLocks[i]) (i.e., for a given shader, how many CBs need to be updated in order to apply the shader, given all of the previous history?);

a number of bytes that need to be copied in order to execute a given shader program (BytesCopied[i]) (i.e., for a given shader, what is the sum of the sizes of the CBs that (a) the shader is dependent on, and (b) need updating?); and a number of wasted bytes copied from each shader program (WastedBytesCopied[i]) (i.e., of the total number of bytes copied for a shader (BytesCopied[i]), how many of them were stale values being copied as an unfortunate side effect of being grouped into the same buffer as freshly consumed values?).

A constant buffer (CB) will be locked and updated if and only if a shader is freshly consuming (state 3) at least one of the CB's constants. If the shader is consuming stale values or consuming none at all, then the constant buffer has necessarily already been locked by a previous shader. At step 920, the observed changes can be quantified using these shader constant metrics. At step 930, the shader constant metrics can be analyzed to determine the changes in usage patterns of shader constants in each constant buffer (during run time) to generate usage pattern data.

For instance, referring to the example in FIG. 6, assuming constant C1 through C5 are in a constant buffer, shader A only consumes C1 and C2, and the other three constants (C3-C5) are wasted. In shader B, constants C1 and C2 are designated as consumed stale. The consumed stale designation can be used to count the order in which shaders are executed. The values C1 and C2 from shader one can be reused or while C3 and C4 need to be updated. There is no need to lock the third constant buffer since C1 and C2 are already stale and the C5 will not be used. As such, for shader A and shader B, the optimal configuration might be that the first constant buffer includes C1 and C2 and the second constant buffer will contain C3 and C4.

Referring again to FIG. 7, at step 770, changes in usage pattern data and/or shader constant metrics can be used to generate an optimal shader constant configuration for each constant buffer.

Heuristics to feed into an optimization algorithm can be defined to help decide how to arrange the shader constants. For example, based on the observed changes in the shader constants in each constant buffer, an optimal arrangement of shader constants in each constant buffer can be determined to optimize performance of each shader program in the context of the particular application. In one implementation, the shader constant metrics can be used to optimize performance of each shader program by determining an optimal size of each of the particular constant buffer; and selecting the optimal shader constants to be included in the particular constant buffer. For instance, the sum(NumCBLocks[i]) and sum(WastedBytesCopied[i]) can be minimized with some configurable ratio to tradeoff between the two. A priority-queue based optimization algorithm can be used that assigns costs to a number of different possible operations (split, merge, etc.). The algorithm can then execute these operations to modify the layout of the buffers using the specified heuristics.

After a number of iterations the optimal value for the shader constants can be arrived at. Thus, once the optimal shader constants and optimal layout of the constant buffers have been determined, the optimal shader constants and optimal layout of the constant buffers can be entered into the files the developer ultimately writes and input into the particular application, and the particular application can be executed.

Example

The table in FIG. 6 lists tri-state values for every combination of shader and constant (table=2 dimensional array). The data in this table can be fed into the optimization algorithm in any of a number of different ways.

For example, at the start of the optimization algorithm, the initial state could be either: each constant in a constant buffer by itself (exception: if there are constants C1 & C2 such that the tri-state value for C1 and C2 are always identical for a given shader (e.g., a column of table in FIG. 6), then the constants C1 and C2 can be combined into the same buffer to start with), all constants could be arranged in one big constant buffer, or constants can be arranged in buffers identically to the way the developer originally configured them (e.g., per an initial guesses and affinity).

For any given state, a "cost" for this state can be defined which is a linear combination of: a number of constant buffer locks required to execute shaders S1 ... SN multiplied by a constant value (number of cycles required per lock, to be determined empirically on various hardware configurations), a number of wasted bytes copied due to lock+discard operations on a given constant buffer (e.g., when a constant is consumed fresh along with stale or unused values in the same constant buffer, some bytes of data are needlessly copied), and optionally, if constants are arranged in buffers per an initial guess of the developer, a constant cost for each constant that has been moved to a constant buffer (e.g., due to either a split or merge operation) other than the one specified initially by the developer.

From any given state split and merge operations are defined. The split operation, for a given constant buffer, splits the given constant buffer into two buffers (A and B) with some constants moving into buffer A and some moving into buffer B. The merge operation, for two given constant buffers (A and B), combines constant buffer A and constant buffer B into one large buffer.

At each step of the algorithm, the current heuristic is calculated followed by a delta value for each possible split or merge operation. To greatly reduce the number of possibilities at each step, certain split and merge operations can be preferred over others based on the actual consumption of constant values by shaders (e.g., based on frequency of update, frequency of use, etc.). A given operation is taken if it results in the largest decrease in total "cost."

There are multiple ways of implementing the present invention, e.g., an appropriate API, tool kit, driver code, operating system, control, standalone or downloadable software object, etc. which enables applications and services to use the systems and methods of the enhanced graphics pipeline invention. The invention contemplates the use of the invention from the standpoint of an API (or other software object), as well as from a software or hardware object that receives any of the aforementioned techniques, including techniques of the common core, the geometry shader or the stream output in accordance with the invention. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to employ a GPU with an enhanced graphics pipeline. For instance, the algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the enhanced graphics pipeline techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of a graphics pipeline, the invention is not so limited, but rather may be implemented to provide a second processing unit. For instance, if the programmer wants to render a display to the screen and process the computational mathematics while performing another function using the CPU, the processing units may need to be utilized to their fullest, whether or not the graphical display is included in the final output. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed:

1. A method for generating an optimal shader constant configuration for shader constant buffers in a graphics pipeline based on observed run-time behavior of a number of shader programs as a particular application executes at run-time, the method comprising:
   updating each shader constant buffer with a particular subset of updated shader constants that need to be modified to execute a particular shader program each time state changes as the particular application runs, wherein the particular subset of updated shader constants are selected from a pool of shader constants;
   observing changes in the shader constants in each shader constant buffer as the particular application runs at runtime, wherein observing changes in the shader constants in each shader constant buffer as the particular application runs during run time, further comprises:
   determining which shader constants are being set, which shader constants are being updated and the order in which the shader constants are being set/updated as the particular application runs during run time; and
   designating each particular shader constant in each particular shader constant buffer associated with a particular shader program as being in one of:
      a first state which indicates that the particular shader does not consume the particular shader constant,
      a second state which indicates that the particular shader is consuming a stale value of the particular shader constant previously consumed by another shader, and
      a third state which indicates that the particular shader is the first shader to consume a newly set value of the particular shader constant;
   determining changes in usage patterns of shader constants in each shader constant buffer to generate usage pattern data based on the observed changes; and
   based on the determined changes in usage pattern data, determining an optimal shader constant configuration for each shader constant buffer including determining an optimal size of each of the particular shader constant buffers and selecting optimal shader constants to be included in each of the particular shader constant buffers to optimize performance of the graphics pipeline based on observed run-time behavior of a particular application.

2. The method of claim 1, further comprising:
   recording usage patterns of shader constants in each shader constant buffer.

3. The method of claim 2, wherein recording usage patterns of shader constants in each shader constant buffer as the particular application runs during run time, further comprises:
   generating a table comprising a number of entries, wherein each entry corresponds to the state of a particular shader constant in a particular shader constant buffer associated with a particular shader program; and
   generating shader constant metrics comprising:
      a number of shader constant buffer updates needed to execute a given shader program,
      a number of bytes that need to be copied to execute a given shader program, and
      a number of wasted bytes copied from each shader program; and,
      wherein the observed changes are quantified using a plurality of shader constant metrics.

4. The method of claim 3, wherein determining the changes in usage patterns of shader constants in each shader constant buffer during run time to generate usage pattern data, comprises:
   analyzing the shader constant metrics to determine the changes in usage patterns of shader constants in each shader constant buffer during run time to generate usage pattern data.

5. The method of claim 4, wherein using the usage pattern data to generate an optimal shader constant configuration for each shader constant buffer, comprises:
   determining, based on the observed changes in the shader constants in each shader constant buffer, an optimal arrangement of shader constants in each shader constant buffer to optimize performance of each shader program in the context of the particular application.

6. The method of claim 5, wherein determining an optimal arrangement of shader constants in each shader constant buffer, comprises:
   optimizing performance of each shader program based on the shader constant metrics.

7. A method for determining shader constants to be placed in each of a plurality of constant buffers to optimize performance of a graphics pipeline based on observed run-time behavior of a particular application, the method comprising:
   applying a number of shader programs as the particular application executes at run-time;
   updating each constant buffer with updated shader constants that need to be modified to execute a particular shader program each time state changes;
   observing changes in the shader constants in each constant buffer, wherein observing changes in the shader constants in each constant buffer as the particular application runs during run time, further comprises:
      determining which shader constants are being set, which shader constants are being updated and the order in which the shader constants are being set/updated as the particular application runs during run time; and
      designating each particular shader constant in each particular constant buffer associated with a particular shader program as being in one of:
         a first state which indicates that the particular shader does not consume the particular shader constant,
         a second state which indicates that the particular shader is consuming a stale value of the particular shader constant previously consumed by another shader, and a third state which indicates that the particular shader is the first shader to consume a newly set value of the particular shader constant;

recording usage patterns of shader constants in each constant buffer based on the observed changes;

determining changes in usage patterns of shader constants in each constant buffer to generate usage pattern data based on the recorded usage patterns; and using the changes in usage pattern data to generate an optimal shader constant configuration for each constant buffer.

8. The method of claim 7, wherein recording usage patterns of shader constants in each constant buffer as the particular application runs during run time, further comprises:

generating a table comprising a number of entries, wherein each entry corresponds to the state of a particular shader constant in a particular constant buffer associated with a particular shader program; and generating shader constant metrics comprising:
- a number of constant buffer updates needed to execute a given shader program,
- a number of bytes that need to be copied to execute a given shader program, and
- a number of wasted bytes copied from each shader program; and,
- wherein the observed changes are quantified using a plurality of shader constant metrics.

9. The method of claim 8, wherein determining the changes in usage patterns of shader constants in each constant buffer during run time to generate usage pattern data, comprises:

analyzing the shader constant metrics to determine the changes in usage patterns of shader constants in each constant buffer during run time to generate usage pattern data.

10. The method of claim 9, wherein using the usage pattern data to generate an optimal shader constant configuration for each constant buffer, comprises:

determining, based on the observed changes in the shader constants in each constant buffer, an optimal arrangement of shader constants in each constant buffer to optimize performance of each shader program in the context of the particular application.

11. The method of claim 10, wherein determining an optimal arrangement of shader constants in each constant buffer, comprises:

optimizing performance of each shader program based on the shader constant metrics.

12. The method of claim 11, wherein optimizing performance of each shader program based on the shader constant metrics, comprises:

determining an optimal size of each of the particular constant buffer; and selecting the optimal shader constants to be included in the particular constant buffer.

13. A graphics interface for displaying a layout and a distribution of the optimal shader constants selected according to the method of claim 12.

14. The method of claim 7, further comprising:
inputting the optimal shader constants into the particular application; and
executing the particular application.

15. A computer storage medium comprising computer executable instructions for performing the method of claim 7.

16. An application programming interface stored on a computer storage medium for instructing a graphics processing unit to perform the method of claim 7.

17. A computer storage medium comprising computer executable instructions for performing operations for generating an optimal shader constant configuration for shader constant buffers in a graphics pipeline based on observed run-time behavior of a number of shader programs as a particular application executes at run-time, the operations comprising:

updating each shader constant buffer with a particular subset of updated shader constants that need to be modified to execute a particular shader program each time state changes as the particular application runs, wherein the particular subset of updated shader constants are selected from a pool of shader constants;

observing changes in the shader constants in each shader constant buffer as the particular application runs at runtime, wherein observing changes in the shader constants in each shader constant buffer as the particular application runs during run time, further comprises:

determining which shader constants are being set, which shader constants are being updated and the order in which the shader constants are being set/updated as the particular application runs during run time; and designating each particular shader constant in each particular shader constant buffer associated with a particular shader program as being in one of:
- a first state which indicates that the particular shader does not consume the particular shader constant,
- a second state which indicates that the particular shader is consuming a stale value of the particular shader constant previously consumed by another shader, and
- a third state which indicates that the particular shader is the first shader to consume a newly set value of the particular shader constant;

determining changes in usage patterns of shader constants in each shader constant buffer to generate usage pattern data based on the observed changes; and based on the determined changes in usage pattern data, determining an optimal shader constant configuration for each shader constant buffer including determining an optimal size of each of the particular shader constant buffers and selecting optimal shader constants to be included in each of the particular shader constant buffers to optimize performance of the graphics pipeline based on observed run-time behavior of a particular application.

* * * * *